United States Patent [19]

Brown et al.

[11] Patent Number: 4,712,236
[45] Date of Patent: Dec. 8, 1987

[54] TELEPHONE HANDSET CONSTRUCTION

[75] Inventors: Reed S. Brown; John J. Consoli, both of Indianapolis; Richard G. Klier, Greenfield, all of Ind.

[73] Assignee: AT&T Information Systems Inc. American Telephone & Telegraph Company, Murray Hill, N.J.

[21] Appl. No.: 857,865

[22] Filed: May 1, 1986

[51] Int. Cl.[4] .............................................. H04R 1/03
[52] U.S. Cl. ................................................... 379/433
[58] Field of Search ............................... 379/433, 428

[56] References Cited

U.S. PATENT DOCUMENTS

| | | | |
|---|---|---|---|
| 3,400,226 | 9/1968 | Krumreich et al. | 379/167 |
| 3,627,930 | 12/1971 | Tolman | 379/433 |
| 4,124,785 | 11/1978 | Serethy et al. | 379/370 |
| 4,130,740 | 12/1978 | Cogan | 379/433 |
| 4,163,875 | 8/1979 | Cogan | 379/433 |
| 4,319,095 | 3/1982 | Cogan | 379/433 |
| 4,420,657 | 12/1983 | Larkin | 379/430 |
| 4,456,794 | 6/1984 | Strömer | 379/433 |
| 4,633,044 | 12/1986 | Nakajima | 379/433 |
| 4,675,903 | 6/1987 | Gukzian et al. | 379/433 |

FOREIGN PATENT DOCUMENTS

| | | | |
|---|---|---|---|
| 166198 | 1/1986 | European Pat. Off. | 379/433 |
| 212633 | 8/1984 | Fed. Rep. of Germany | 379/433 |
| 1180080 | 2/1970 | United Kingdom | 379/428 |

OTHER PUBLICATIONS

WIPO 8201632, "Fastening Arrangement for Holding Together Two Sections of a Telephone Handset Casing", Lindberg et al., May 1982.

Primary Examiner—Thomas W. Brown
Assistant Examiner—Danita R. Byrd
Attorney, Agent, or Firm—Harry L. Newman

[57] ABSTRACT

A telephone handset comprises elongated complementary upper and lower housing members that mate at their perimeters to form a hollow handset housing. The lower housing member includes spaced transducer mounting positions, each of which accommodates both an individual transducer and a transducer mounting member for holding the transducer in the transducer mounting position. Each transducer mounting member is secured to the lower housing member and an upper surface of each enclosure inlcudes a recess for accommodating a bonding material. In addition, the upper housing member includes elements that extend into the recesses of the transducer mounting members when the upper housing member is mated to the lower housing member. The bonding material in the recesses serves to secure the two housing members together.

7 Claims, 2 Drawing Figures

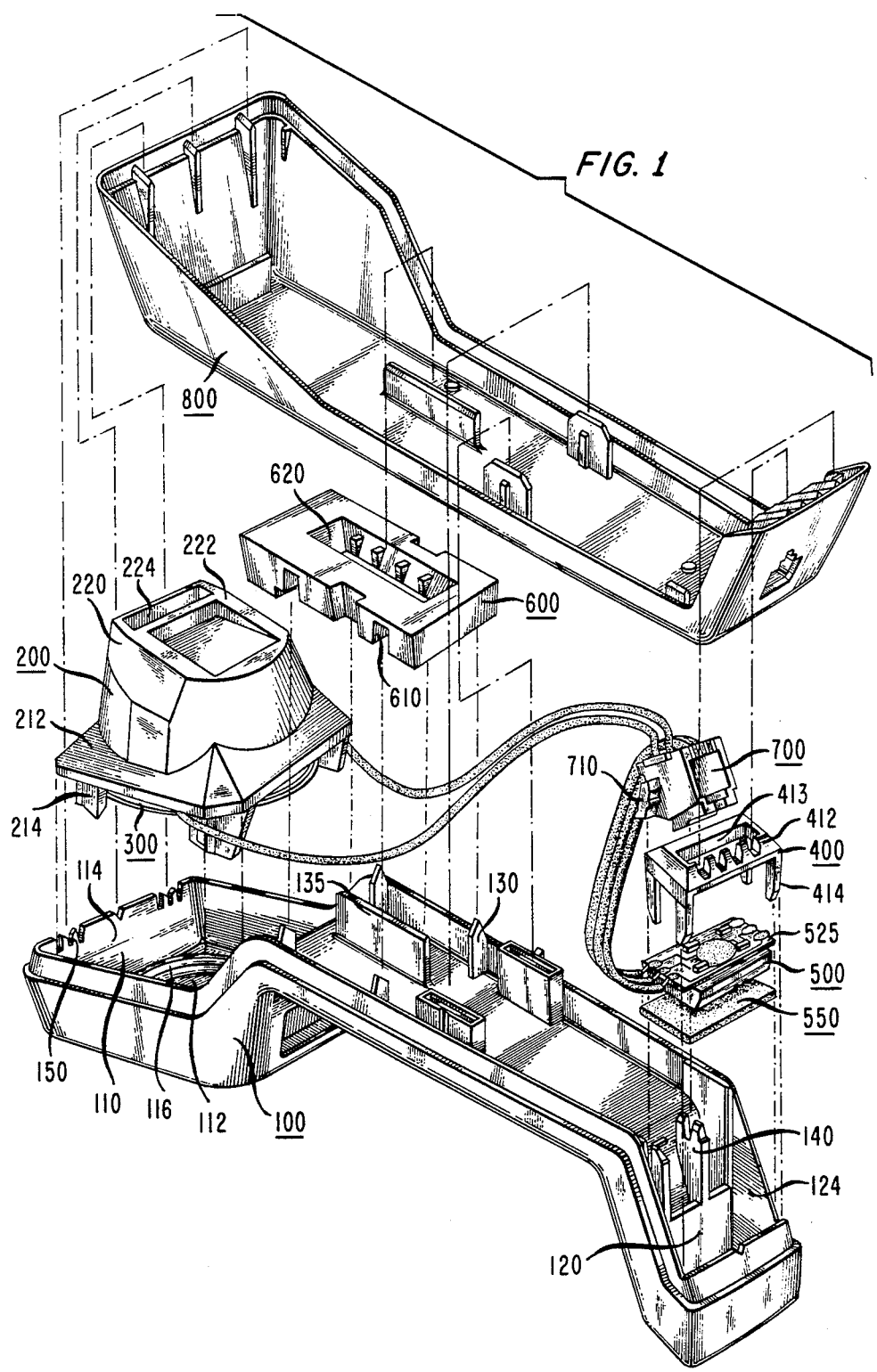

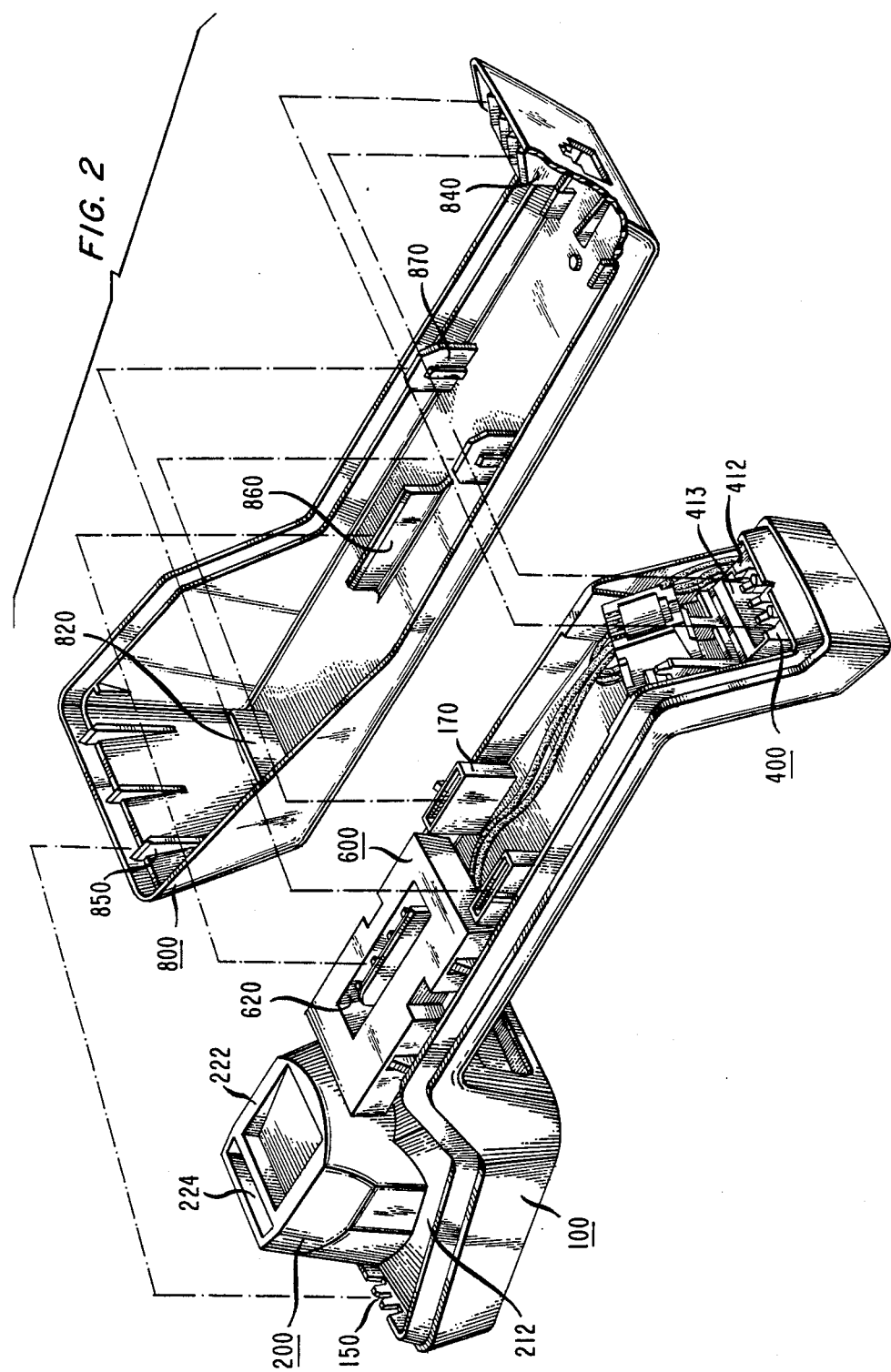

TELEPHONE HANDSET CONSTRUCTION

TECHNICAL FIELD

This invention relates to telephone handsets, and within that field to a telephone handset construction that facilitates the assembly of handset components.

BACKGROUND OF THE INVENTION

A popular form of handset construction today comprises an upper and lower pair of elongated complementary housing members that meet at their perimeters. These housing members, which serve to enclose the components housed within the handset, are typically joined together by one or more fasteners. If the fasteners are left exposed, it detracts from the appearance of the handset, and therefore an additional component is typically mounted on the handset to cover up the fasteners or the fasteners are placed in an obscure location. In either case, this arrangement does not lend itself to automation and/or it is labor intensive and/or it adds to the cost of the handset.

As an alternative to the use of fasteners, the housing members have been joined together by the application of a bonding material to their perimeters. This arrangement is also difficult to automate and in addition it is difficult to keep the bonding material from flowing off of the perimeter surfaces and onto the appearance surfaces of the housing members. Such a flow onto the appearance surfaces, of course, detracts from the appearance of the handset.

SUMMARY OF THE INVENTION

A handset housing structure in accordance with the present invention facilitates the assembly not only of the housing members but also of the components contained within the handset. The lower housing member includes a pair of spaced transducer mounting positions, and an individual transducer mounting member is associated with each transducer mounting position. Each transducer mounting member is accommodated in the associated transducer mounting position and has an upper surface that has a recess for accommodating a bonding material. In addition, an individual transducer is accommodated by each transducer mounting member and is held in a transducer mounting position by the transducer mounting member in which it is accommodated.

The upper housing member has a pair of spaced elements that respectively extend into the recesses in the upper surface of the transducer mounting members when the upper housing members is mated to the lower housing member. The bonding material in the recesses, when cured, serves to secure the housing members together.

The recesses in the upper surfaces of the transducer mounting members provide a superior receptacle for the bonding material compared to the perimeters of one or both of the housing members. It is easy to make the size of the recesses such that the bonding material can be placed in the recesses either by hand, should cheap labor be available, or by automated equipment. In addition, should the bonding material flow out of the recesses, it does not flow onto an appearance surface of the handset.

If desired, the transducer mounting positions of the lower housing member can be made cup-shaped and the perimeters of one or both of the transducer mounting members can be shaped to cooperate with the associated transducer mounting position to provide a recess around the perimeter of the transducer mounting member. The bonding material can then be placed in this recess at essentially the same time that it is placed in the recess in the upper surface of the transducer mounting member. The bonding material then serves to both secure the transducer mounting member in place and to secure the upper and lower housing members together.

BRIEF DESCRIPTION OF THE DRAWING

FIG. 1 is an exploded perspective view of a handset in accordance with the invention, the upper housing member being rotated 180 degrees to more clearly show its interior structure; and FIG. 2 is the same as FIG. 1 except that the components of the handset other than the upper housing member are shown assembled to the lower housing member.

DETAILED DESCRIPTION

Referring to the drawing, in one illustrative embodiment of the invention a telephone handset comprises a lower housing member 100 having a transducer mounting position 110 at one end. The transducer mounting position 110 is generally cup-shaped in that it includes a bottom surface 112 circumscribed by an upstanding wall 114, and a transducer mounting member 200 is accommodated by the transducer mounting position. The transducer mounting member 200 comprises a closure portion 212, the perimeter of which closely fits within the upstanding wall 114 of the transducer mounting position 110. The perimeter of the closure portion 212 is thereby essentially contiguous with the interior surface of the upstanding wall 114. In addition, the upper surface of the closure portion 212, immediately adjacent to the perimeter, slopes upwardly as it moves inwardly from the perimeter to provide a recess around the perimeter when the transducer mounting member 200 is positioned within the transducer mounting position 110.

The transducer mounting member 200 further comprises a multiple of spaced legs 214 depending from the closure portion 212 adjacent to its perimeter. The legs 214 support the transducer mounting member on the bottom surface 112 of the transducer mounting position 110. In addition, the legs 214 frictionally engage the upstanding wall 114 of the transducer mounting position 110 to hold the transducer mounting member 200 in place. Finally, the legs 214 include portions that are adapted to straddle and frictionally engage the side surface of a receiver 300, such as the circular electromagnetic receiver commonly in use in telephone handsets. The receiver 300 is thereby secured to the transducer mounting member 200, and the legs 214 are of a height to place the perimeter of the surface of the receiver from which sound waves emanate in engagement with a circular raised rib 116 on the bottom surface 112 of the transducer mounting position 110. The raised rib 116 circumscribes a multiple of holes (not shown) in the bottom surface 112.

The transducer mounting member 200 further comprises an inverted cup-shaped portion 220 that extends upward from the closure portion 212 and serves as the back chamber for the receiver 300. In addition, the upper surface 222 of the transducer mounting member 200 has a recess 224 for receiving bonding material.

At the other end of the lower housing member 100 is a second transducer mounting position 120 that is also generally cup-shaped in that it has a bottom surface (not shown) circumscribed by an upstanding wall 124. The transducer mounting position 120 accommodates a transducer mounting member 400 having a closure portion 412, the perimeter of which closely fits within the upstanding wall 124 of the the transducer mounting position 120. The perimeter of the closure portion 412 is thereby essentially contiguous with the interior surface of the upstanding wall 124. In addition, the upper surface of the closure portion 412 immediately adjacent to the perimeter slopes upwardly as it moves inwardly from the perimeter to provide a recess around the perimeter when the transducer mounting member 400 is positioned within the transducer mounting position 120. The upper surface of the closure portion 412 also includes a recess 413 in its center.

The transducer mounting member 400 further comprises a multiple of spaced legs 414 depending from the closure portion 412 adjacent to its perimeters. The legs 414 support the transducer mounting member on the bottom surface of the transducer mounting position 120. In addition, the legs 414 frictionally engage the upstanding wall 124 of the transducer mounting position 120 to hold the transducer mounting member 400 in place. Finally, the legs 414 straddle a transmitter 500 such as the electric transmitter disclosed in U.S. Pat. No. 4,492,825 issued to A. M. Brzezinski et al on Jan. 8, 1985. The transmitter 500, which has a printed circuit board 525 joined to its upper surface, is located so that input ports on its lower surface face openings in the bottom surface of the transducer mounting position 120. An acoustic damping foam 550 is positioned between the transmitter 500 and the bottom surface.

Intermediate the transducer mounting positions 110 and 120, the lower housing member 100 supports a weight 600 and a modular jack 700. The weight 600 serves to give the handset a balance and total weight that consumers find desirable. The weight 600 includes a pair of spaced grooves 610 in each of its sides (only one pair being shown), that receive posts 130 extending upwardly from an interior surface of the lower housing member 100 adjacent to the transducer mounting position 110. Posts 130 cooperate with the grooves 610 to properly locate the weight 600. In addition, the weight 600 includes an elongated opening 620 approximately in its center that receives a tongue 135 extending upwardly from the interior surface of the lower housing member 100 in between the posts 130. The opening 620 tapers inwardly in that it is wide at the upper surface of the weight 600 and narrow at the lower surface of the weight. The tongue 135 is shaped to essentially fill the opening 620 at its lower end.

The jack 700 includes a pair of laterally extending flanges 710 (only one of which is shown) that are accommodated by slots in a pair of spaced ribs 140 extending from the interior surface of the lower housing member 100 adjacent to the transducer mounting position 120. The flanges 710 cooperate with the slots in the ribs 140 to frictionally secure the jack 700 in place.

Referring now to FIG. 2, with the components assembled as shown, the handset is completed by an upper housing member 800 that is complementary to, and mates with, the lower housing 100 at its perimeter to form an enclosure for the components. The outer surface of the perimeter of the lower housing member 100 is relieved while the inner surface of the perimeter of the upper housing member 800 is relieved. Consequently, when the upper and lower housing members 100 and 800 are mated together, the perimeter of the upper housing member overlaps the perimeter of the lower housing member.

The interior surface of the upper housing member 800 has a tongue 820 at its receiver end, a tongue 840 at its transmitter end, and a tongue 860 therebetween. These tongues 820, 840 and 860 are of a height and are located so that when the upper housing member 800 is mated to the lower housing member 100 the tongue 820 extends into recess 224 in the transducer mounting member 200, the tongue 840 extends into the recess 413 in the transducer mounting member 400, and the tongue 860 extends into the opening 620 in the weight 600. Consequently, by applying a bonding material, such as an ABS solvent based bonding material to: (1) the perimeter of the closure portion 212 of the transducer mounting member 200, (2) the recess 224 in the upper surface of the transducer mounting member 200, (3) the opening 620 in the weight 600, (4) the perimeter of the closure portion 412 of the transducer mounting member 400, and (5) the recess 413 in the upper surface of the transducer mounting member 400, the transducer members 200 and 400 and the weight 600 are secured in place and the upper housing member 800 is secured to the lower housing member 100.

Since the bonding material may take some time to cure, the upper and lower housing members 800 and 100 include elements to frictionally hold them together during this time. At the receiver end, the perimeter of the lower housing member 100 has multiple teeth pairs 150 that frictionally engage ribs 850 adjacent to the perimeter of the upper housing member 800. In the middle of the handset, the lower housing member has a pair of spaced hollow rectangular posts 170 upstanding from its interior surface that receive a pair of spaced tongues 870 having protrusions on their sides so as to provide a friction fit with the posts. Finally, at the transmitter end the lower housing member 100 has a tapered lip 180 that is engaged by a multiple of undercut teeth 840 on the upper housing member 800, the lip flexing to move beneath the undercut teeth when pressure is applied to move the transmitter end of the upper housing member into engagement with the transmitter end of the lower housing member.

What is claimed is:

1. A telephone handset comprising:
   a lower housing member having a pair of spaced transducer mounting positions;
   an individual transducer mounting member associated with each transducer mounting position, each transducer mounting member being accommodated by the associated transducer mounting position and each transducer mounting member having an upper surface that includes a recess for accommodating a bonding material;
   an individual transducer accommodated by each transducer mounting member and held in a transducer mounting position by the transducer mounting member in which it is accommodated; and
   an upper housing member adapted to mate with the lower housing member to form a handset housing, the upper housing member having pair of spaced elements that respectively extend into the recesses in the upper surface of the transducer mounting members when the upper housing member is mated to the lower housing member, the upper housing member being secured to the lower housing member by the bonding material in the recesses.

2. A telephone handset as in claim 1 wherein each transducer mounting position is generally cup-shaped and each transducer mounting member closely fits within the associated transducer mounting position.

3. A telephone handset as in claim 2 wherein the perimeter of each transducer mounting member is shaped so that when it is positioned within the associated transducer mounting position, the transducer mounting member in combination with the associated transducer mounting position provides a recess for accomodating a bonding material that secures the transducer mounting member and thereby the transducer accomodated by the transducer mounting member to the lower housing member.

4. A telephone handset as in claim 1 wherein each transducer nests into the transducer mounting member in which it is accommodated and this combination nests into the associated transducer mounting position of the lower housing member.

5. A telephone handset as in claim 1 wherein the transducer mounting positions are at each end of the lower housing member and an additional component is accommodated by the lower housing member intermediate the transducer mounting positions, the additional component having a recess in its upper surface for accommodating a bonding material and the upper housing member having an element that extends into the recess in the additional component when the upper housing member is mated to the lower housing member.

6. A telephone handset as in claim 1 wherein the upper housing member includes elements for frictionally securing the upper housing member to the lower housing member to hold the two housing members in proper engagement while the bonding material reaches a condition to permanently secure the two housing members together.

7. A telephone handset comprising:
a lower housing member having a pair of spaced transducer mounting positions, each mounting position accommodating an individual transducer and a transducer mounting member for holding the transducer in the transducer mounting position, the perimeter of each transducer mounting member being shaped to provide in combination with a mating portion of the lower housing a recess for accommodating a bonding material for securing the transducer mounting member and thereby the associated transducer to the lower housing member, an upper surface of each transducer mounting member including a recess for also accommodating bonding material, and an upper housing member that mates with the lower housing member to form a handset housing, the upper housing member having elements that respectively extend into the recesses in the upper surfaces of the transducer mounting members when the upper housing member is mated to the lower housing member, the upper housing member being secured to the lower housing member by the bonding material in the recesses.

* * * * *